United States Patent [19]

Pena

[11] Patent Number: 4,966,539

[45] Date of Patent: Oct. 30, 1990

[54] SEAL FOR PISTON SCREWS IN PLASTICS INJECTION AND EXTRUSION APPARATUS

[76] Inventor: Juan R. Pena, Arquimedes, s/n, Badalona, Barcelona, Spain

[21] Appl. No.: 220,669

[22] Filed: Jul. 18, 1988

[30] Foreign Application Priority Data

May 12, 1988 [ES] Spain .................................... 8801917

[51] Int. Cl.$^5$ .............................................. B29C 45/52
[52] U.S. Cl. ...................................... 425/208; 137/854; 366/78; 425/376.1; 425/559; 425/563; 425/587
[58] Field of Search ...................... 425/208, 376.1, 562, 425/563, 559, 586, 587; 366/79–81, 78, 83, 85, 88, 90; 239/486, 584; 137/852, 854; 264/211.21

[56] References Cited

U.S. PATENT DOCUMENTS

| 3,593,375 | 7/1971 | Hendry | 425/208 X |
|---|---|---|---|
| 3,728,053 | 4/1973 | Stillhard et al. | 366/78 X |
| 4,355,905 | 10/1982 | St. Louis et al. | 366/79 |
| 4,447,156 | 5/1984 | Csonger | 425/208 X |
| 4,472,058 | 9/1984 | Pirro | 366/78 |
| 4,477,242 | 10/1984 | Eichlseder et al. | 366/79 X |
| 4,557,683 | 12/1985 | Meeker et al. | 366/78 X |
| 4,558,954 | 12/1985 | Barr | 425/208 X |
| 4,609,006 | 9/1986 | Parkison et al. | 137/854 X |

FOREIGN PATENT DOCUMENTS 2483842  12/1981  France .............................. 425/208

Primary Examiner—Richard L. Chiesa
Attorney, Agent, or Firm—Fleit, Jacobson, Cohn, Price, Holman & Stern

[57] ABSTRACT

An extruder screw of a plastic injection molding machine has a tip seal device at its forward end. The tip seal device has a body portion and a tapering tip portion, a circumferential sealing skirt is provided between the tip portion and the body portion. During extrusion, the pressure of molding material behind the skirt compresses it radially to allow for passage of the material through an extruder nozzle. When the screw is moved forwardly after extrusion, pressure of material forwardly of the skirt increases and expands the skirt radially into contact with the extruder barrel to form a seal.

4 Claims, 2 Drawing Sheets

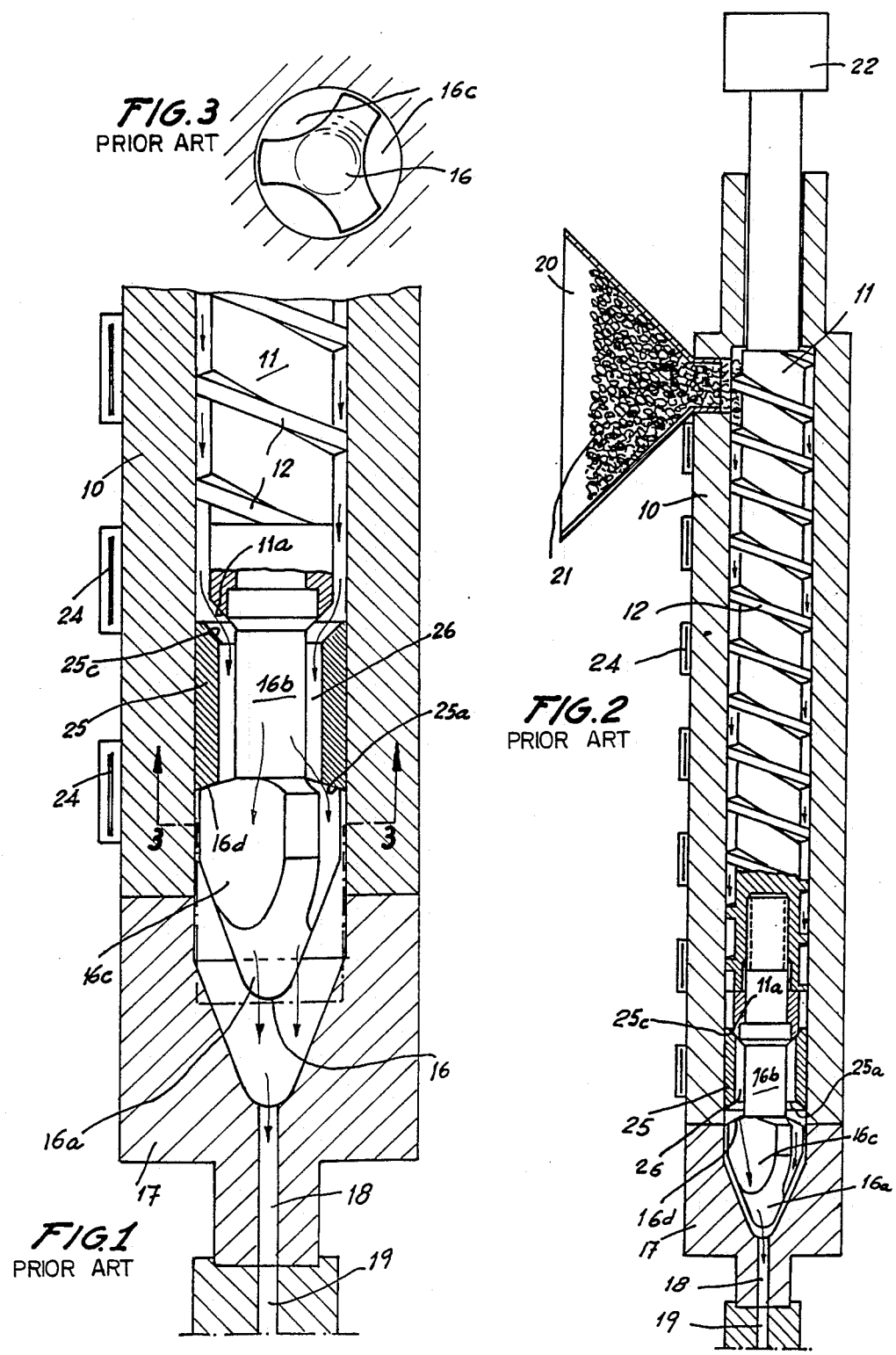

SEAL FOR PISTON SCREWS IN PLASTICS INJECTION AND EXTRUSION APPARATUS

BACKGROUND OF THE INVENTION

The present invention relates, as stated in the title, to improved seal for piston screws in plastics injection and extrusion apparatus, the new constructional, shape and design features of which fulfill the mission for which it has been specifically devised with maximum reliability and efficiency.

In the plastics industry, and more particularly in the sector using plastics injection machines, the problem existing in the screw end sealing systems (movable valves, seals with ball valves and others) during the injection cycle, when the end of the screw is acting as a piston, is well-known. Such problems are always derived from a premature wear of the friction areas of the facing surfaces, that is the rear portion of the tip and the front portion of the concentrically mounted valve, when the plastics material is charged and is transferred to the front injection chamber.

The abovementioned valve is mounted in ring fashion around the tip stem and slides backwards when the piston pushes the screw to cut off the supply of plastic material to said front injection chamber.

The movement of the valve over the tip or on the front portion of the screw is the cause of the said frictional wear due of the high tonnage pressure transmitted by the piston to the screw and by the latter to the tip and the valve, all of which means that both the tip and the valve must be frequently replaced, as a result of the play that the friction between the facing surfaces finally produces.

The replacement of the tip and valve causes periodic stoppages during which it is necessary to dismantle the injection barrel and remove the screw, together with the tip and the valve. All of this causes downtime, together with the corresponding costs of assembly and dismantling and replacement of the said tip and valve. Thus production is completely interrupted during said downtime and the injection machine becomes unproductive until the worn tip and valve have been replaced.

SUMMARY OF THE INVENTION

To overcome the above drawbacks, which at the present time may be considered as traditional in the plastics industries using injection machines, the applicant has developed a piston sealing system in which there are no tangential areas of friction or facing surfaces between the rear portion of the tip and the front portion of the valve, thereby eliminating wear at the same time as a mixing labyrinth is included, notably improving the plastification and homogenization of the plastic materials having master batch or filler charges. At the same time said piston sealing system eliminates the valve which was previously mounted concentrically around the rear stem of the tip.

The improved seal of the present invention consists of a substantially tapering lance plug extending into a further cylindrical area and having at the rear in the base of the tapering portion expandable lips which, when the screw moves forwards in the injection direction pushed by the piston, close the annular gap allowing the passage of the plastic material during the charge stage. The special treated steel material is resilient, recovering its original dimension when the injection pressure is released, with the necessary space between the front injection chamber and the lance tip depending on the specific chemical peculiarities of the plastic material, colour and part to be moulded.

The cylindrical portion of said lance plug comprises a mixing labyrinth which improves the plastification features, and extends rearwardly to form a small threaded cylinder having a smaller diameter which allows the lance plug to be replaced by others adapted to other types of manufacture as well to replace original conventional tips by the tip of the present invention, which means that it is not necessary to modify the screw housings in any way in the sealing module in the injection chambers present in plastics injection machines currently on the market.

Other details and features of the present invention will be disclosed in the following description, in which reference is made to the drawings accompanying this specification in which the preferred details are represented rather schematically. These details are given as an example, with reference to one possible practical embodiment, but the invention is not limited to the details given here. Therefore this description should be considered from an illustrative point of view, without limitations of any kind.

BRIEF DESCRIPTION OF THE DRAWINGS

FIG. no. 1 is a longitudinal section view of a conventional injection chamber with the main elements such as heating elements (24) heating said injection chamber (10), the screw (11) with its flights (12) and, at the front end of the screw (11), the tip (16) and valve (25).

FIG. no. 2 is a longitudinal section partial view of figure no. 1, on a larger scale, in which the valve (25) may be seen to have moved backwardly which occurs when the piston (22) pushes the screw (11), thereby closing the passage of plastic material through the annular passage (26).

Figure 6:
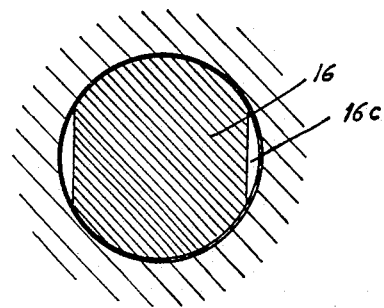

FIG. no. 3 is a cross section view on the line 3—3 of the FIG. 2.

FIG. no. 4 is one embodiment of the object of the present invention wherein a conventional injection chamber (10) may be seen with the screw (11) and flights (12), the front portion of the screw (11) being provided with the lance tip (16) with its expandable lips (15), the tip having on the cylindrical portion thereof the mixing labyrinth (14) which extends rearwardly to form a smaller diameter cylindrical portion (13) allowing the lance plug (16) to be screwed into the screw (11).

Figure 5:
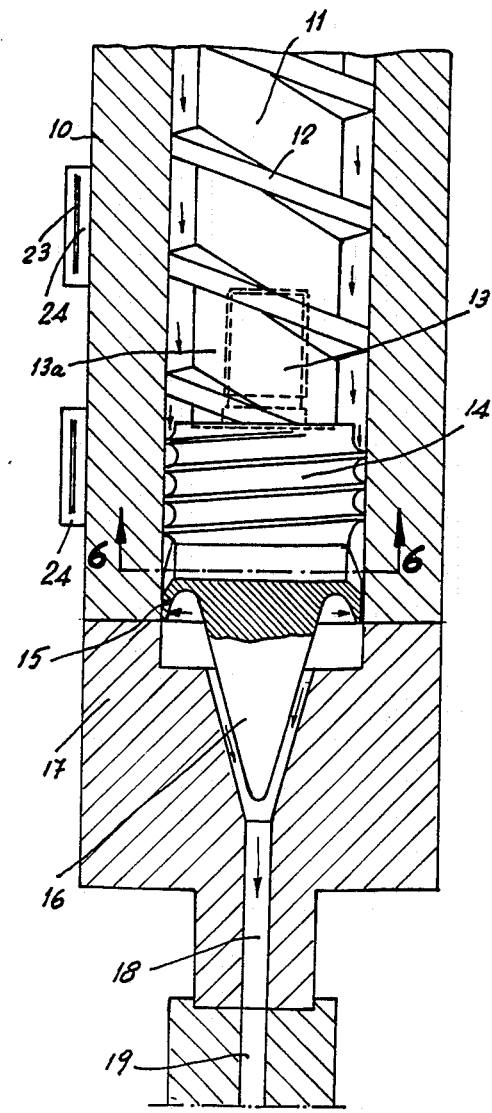

FIG. 5 also illustrates an injection barrel (10) in the interior of which there is the screw (11) with flights (12) and lance plug (16) in the moment in which the skirt (15) expands and closes the passage of the plastics. material from (14), when the screw (11) is pushed by the piston (22).

FIG. no. 6 is a cross section view on the line 6—6 of FIG. no. 5.

DESCRIPTION OF THE PREFERRED EMBODIMENTS

The injection machines available on the market are usually provided in the interior thereof with an injection barrel (10) having mounted therein sliding and initially rotatively a screw (11) with flights (12) which is supplied through the hopper (20) with the pellets (21). These pellets (21), due to the initial heat provided by the electric heating elements (24), melt on the surface of the screw (11). The helical flight completely covering the screw causes the molten material to move from right to left towards the left hand end of the screw where the tip (16) is located. Said tip (16) has a sustantially tapering front portion which extends rearwardly to form a cylindrical stem (16b) on which there is concentrically mounted the valve (25). Said valve (25) in a first position as shown in FIG. 2, on having its inside diameter larger than theoutside diameter of the stem (16b) forms a cylindrical passage or ring (26) through which the molten material is transferred towards the lance tip (16) and compressed in the front injection chamber (17), until at a particular moment in time, by the axial thrust of the piston (22) on the screw (11) as well as on all the elements attached thereto, such as is the tip (16), such elements advance forward pushing the molten plastic material in said front injection chamber (17) through the nozzle (18) and (19) towards the mould not shown in FIG. no. 2.

At this time, by action of the piston (22) on the screw, the valve (25) moves from left to right whereby its surface (25c) abuts the surface (11a) of the screw (11) closing the passage of the molten plastic material through the annular passage or ring (26).

Each time a part is injection moulded, the same cycle described above is repeated, whereby in the said injection machines having injection screws (11) such as those described, a routine maintenance operation is to dismantle and replace the tip (16) and the valve (25) as a result of the wear of the abutting surfaces (16d) and (25a) which are in contact when the hopper (20) feeds material to the screw, whereafter the contacting surfaces are (11a) of the screw (11) and (25c) of the valve (25). This reciprocating movement of the valve (25) for each cycle, that is for each injection moulded part, is the cause of the premature wear of the aforesaid abutting surfaces, whereby although said sealing system is widely used, it has the previously described drawbacks of wear.

Figure 4:
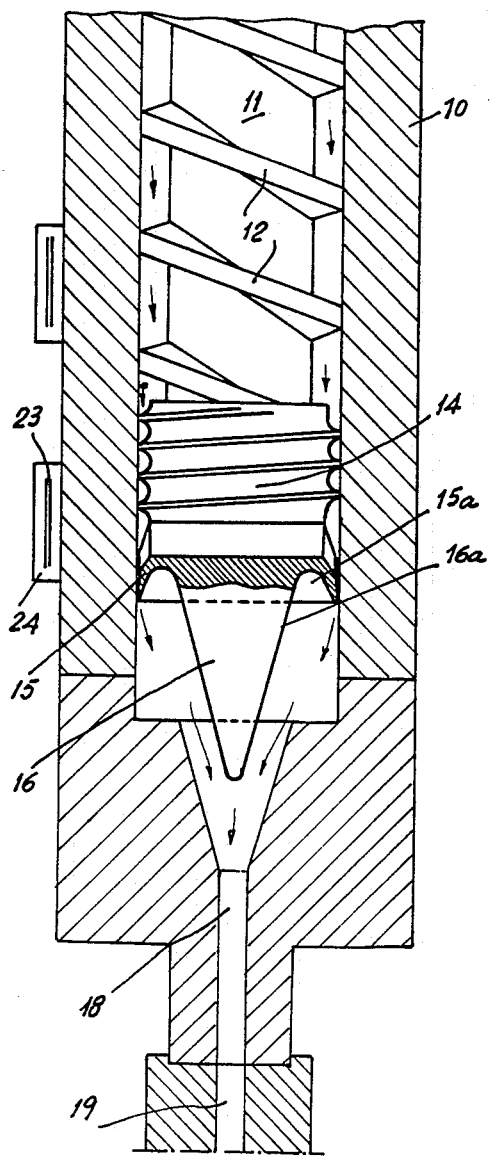

The object of the present invention in one of the preferred embodiments as shown in FIGS. 4, 5 and 6 abandons the common practice of using the valve (25) as an opening and sealing member for the passage of the molten plastic material through the annular passage (26) and replaces it in the first place by a skirt (15) situated in the base of the generally tapering lance tip (16), which skirt (15) by reaction of the molten material in the front injection chamber (17) at the time when the piston (22) transmits its force to the screw (11), expands and in this way completely abuts the inner cylindrical surface of the injection barrel (10). In this way the passage of the molten material through the labyrinth (14), having the purpose of improving the mixing of the plastics materials used in the composition of the part to be injection moulded is interrupted.

The lance tip (16) has four clearly defined areas. The foremost portion (16a) is generally tapering and at the base thereof there is a second portion (15) forming a skirt which delimits the open cavity (15a). Said skirt (15) extends rearwardly to form a cylindrical area covered by the labyrinth (14) and said portion finally extends to form afurther cylindrical portion (13) of smaller diameter and having the corresponding screw thread, facilitating the mounting of the lance tip (16) to the screw (11), whereby the tips of the traditional model may be replaced by those of the invention, with it being only necessary to unscrew the conventional tips and replace them by those of the present invention.

The injection cycle for a plastics part is carried out in the same way as in the conventional systems. The pellets (21) descend along the hopper (20) and enter in the injection barrel (10), feeding slowly forward from right to left, urged by the screw (11) and flights (12) thereof in a horizontal spiral movement, thereafter entering through the labyrinth (14) and flowing over the depressed portions (16c) of the foremost portion of the generally tapering tip (16), with the molten plastic material being deposited in the injection chamber (17). At the time when the piston (22) engages the screw (11) and because of the great force exerted by the molten material in the front injection chamber (17) by reaction against the pressure of the piston (22), a reaction force exerted on the cavity (15a) delimited by the skirt (15) and the base of the tapering portion (16) is generated, causing said skirt (15) to expand its diameter, thereby preventing the passage of the plastic material from the labyrinth (14) through the depressed areas (16c) towards the injection chamber (17).

The efficiency of the above improvement seal resides basically in the elimination of the valve (25) which with its reciprocating movement caused wear of the surface (16d) of the tip (16), as well as wear of the surface (11a) of the screw (11), at the same time as the valve (25), also on abutting the aforementioned surfaces underwent wear of the end surfaces (25a) and (25c), which abut the surfaces (16d) of the tip (11a) of the screw (11).

It will be understood after observing the drawings and the explanations given thereon that the present invention provides a simple effective construction which may be reduced to practice with great ease, constituting without any doubt a new industrial result.

It is noted for the pertinent effects that as many variations and modifications of detail as advised by the circumstances and practice may be made in the object of the present invention, provided that the variations made do not alter or modify the essence as summarized in the following claims.

What I claim is:

1. In an extruder having an extruder barrel, an extruder screw in the barrel, and means for moving the extruder screw axially in the barrel between respective forward and back positions for charging and extrusion respectively, the improvement comprising a tip seal device at a forward end of the screw, said device including a radially expandable and contractible circumferential skirt, the skirt contracting radially responsive to pressure of molding material from behind the skirt to allow passage of the material over the skirt for extrusion when the screw is in the back position, and the skirt expanding radially into contact with the barrel responsive to pressure of material from in front of the skirt when the screw is in the forward position.

2. In an extruder having an extruder barrel, an extruder screw in the barrel, and means for moving the extruder screw axially in the barrel between respective forward and back positions for charging and extrusion respectively, the improvement comprising a tip seal device at a forward end of the screw, said device including a radially expandable and contractible circumferential skirt, the skirt contracting radially responsive to pressure of molding material from behind the skirt to allow passage of the material over the skirt for extrusion when the screw is in the back position, and the skirt expanding radially into contact with the barrel responsive to pressure of material from in front of the skirt when the screw is in the forward position wherein the seal device comprises a body portion and a tapering tip portion and wherein the skirt is formed substantially at a junction between the body portion and the tip portion.

3. The improvement as defined in claim 2 including releasable attachment means between the seal device and the screw.

4. The improvement as defined in claim 2 wherein the body portion of the device has an exterior surface with means defining a labyrinth path for passage of molding material over said surface.

* * * * *